United States Patent
Amrhein et al.

(10) Patent No.: US 7,892,644 B2
(45) Date of Patent: Feb. 22, 2011

(54) MICROSCAPSULE POWDER

(75) Inventors: Patrick Amrhein, Hochheim (DE);
Albert Spannagel, Gaiberg (DE);
Hermann Ascherl, Dirmstein (DE);
Gabriele Lang-Wittkowski, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 151 days.

(21) Appl. No.: 11/817,336

(22) PCT Filed: Mar. 3, 2006

(86) PCT No.: PCT/EP2006/060439
§ 371 (c)(1), (2), (4) Date: Aug. 29, 2007

(87) PCT Pub. No.: WO2006/092439
PCT Pub. Date: Sep. 8, 2006

(65) Prior Publication Data
US 2008/0318048 A1    Dec. 25, 2008

(30) Foreign Application Priority Data
Mar. 4, 2005 (DE) .................. 10 2005 010 563
Apr. 15, 2005 (DE) .................. 10 2005 017 635

(51) Int. Cl.
*B32B 15/02* (2006.01)
*C08F 2/32* (2006.01)

(52) U.S. Cl. ............... 428/402.21; 428/402.22; 428/402.24; 159/48.1

(58) Field of Classification Search .... 428/402–402.24; 427/213.3–213.36; 264/4–4.7; 523/223; 524/556, 156, 394, 395
See application file for complete search history.

(56) References Cited

U.S. PATENT DOCUMENTS

| | | | | | |
|---|---|---|---|---|---|
| 4,911,232 | A | * | 3/1990 | Colvin et al. | 165/104.17 |
| 5,007,476 | A | * | 4/1991 | Newkirk et al. | 164/97 |
| 5,007,478 | A | * | 4/1991 | Sengupta | 165/10 |
| 6,200,681 | B1 | * | 3/2001 | Jahns et al. | 428/402.24 |
| 6,482,433 | B1 | * | 11/2002 | DeRoos et al. | 424/464 |
| 7,166,355 | B2 | | 1/2007 | Jahns et al. | |
| 2006/0199011 | A1 | | 9/2006 | Jahns | |

FOREIGN PATENT DOCUMENTS

| | | |
|---|---|---|
| DE | 101 39 171 A1 | 2/2003 |
| DE | 102 09 222 A1 | 9/2003 |
| EP | 1 029 018 | 8/2000 |
| WO | WO 99/24525 | 5/1999 |
| WO | WO 2004/092299 A1 | 10/2004 |
| WO | WO 2005/116559 A1 | 12/2005 |
| WO | WO 2006/018130 A1 | 2/2006 |

* cited by examiner

*Primary Examiner*—James Seidleck
*Assistant Examiner*—S. Camilla Pourbohloul
(74) *Attorney, Agent, or Firm*—Oblon, Spivak, McClelland, Maier & Neustadt, L.L.P.

(57) ABSTRACT

The present invention relates to a microcapsular powder having a latent heat storage material as a capsule core and a capsule wall constructed of
from 10% to 100% by weight of one or more $C_1$-$C_{24}$-alkyl esters of acrylic and/or methacrylic acid (monomers I),
from 0% to 80% by weight of a water-insoluble or substantially water-insoluble bi- or polyfunctional monomer (monomers II), and
from 0% to 90% by weight of other monomers (monomer III) all based on the total weight of the monomers,
having an average particle size in the range of 150-400 μm and having 80% by weight of particles $\geq$90 μm in diameter, to a process for its production and to its use in bindered building materials, textiles and dumped beds.

19 Claims, No Drawings

MICROSCAPSULE POWDER

The present invention relates to a microcapsular powder having latent heat storage materials as a capsule core and a capsule wall constructed of from 10% to 100% by weight of one or more $C_1$-$C_{24}$-alkyl esters of acrylic and/or methacrylic acid (monomers I), from 0% to 80% by weight of a water-insoluble or substantially water-insoluble bi- or polyfunctional monomer (monomers II), and from 0% to 90% by weight of other monomers (monomer III)

all based on the total weight of the monomers, to a process for its production, to its use in bindered building materials, textiles, heat transfer fluids and dumped beds.

Building materials combined with latent heat storage media have been studied as a novel combination of materials in recent years. Their working principle relies on the transformation enthalpy which arises during the solid/liquid phase transition and which signifies an absorption of energy or release of energy to the environment. They can consequently be utilized to keep a temperature constant within a fixed temperature range. Since latent heat storage materials, moreover, are present in liquid form depending on the temperature, they cannot be processed directly with building materials, since emissions to the indoor air and also separation from the building material would have to be expected.

EP-A-1 029 018 teaches the use of microcapsules having a capsule wall of a highly crosslinked methacrylic ester polymer and a latent heat storage core in bindered building materials such as concrete or gypsum. DE-A-101 39 171 describes the use of microencapsulated latent heat storage materials in gypsum plasterboards. Furthermore, prior US application Ser. No 60/573420 teaches the use of microencapsulated latent heat storage materials in chipboard panels together with melamine-formaldehyde resins as a binder.

The microcapsular powder used according to these references has average particle sizes in the range of 2-25 μm. The size of these pulverulent particles is thus equal to the capsule sizes in the microcapsular dispersions. However, such fine powders are often difficult to process. The consequence is formulations having a high binder content. In addition, they tend to dust because of the high fraction of fines. This is additionally disadvantageous with regard to workplace safety. Powders having a high fraction of fine particulates require particular protective measures (respirators) and also, because of the heightened risk of dust explosion, additional measures to handle such powders.

Prior PCT application PCT/EP2005/008354 teaches coarsely divided microcapsular preparations where the microcapsular powder is extruded with a polymeric binder to form particles which are preferably above 500 μm in size. However, there are applications where a powder would be desirable.

An important criterion for applications as a finish in the textile sector is durability to dry cleaning, i.e., resistance to chlorinated or perchlorinated solvents. Conventional microcapsules are observed to lose weight due to wax being dissolved out of defect capsules or of noncapsulated wax. Often, such washout losses are in the range of 5-15%.

It is an object of the present invention to provide a microcapsular powder which has latent heat storage materials as a capsule core and which possesses enhanced durability to dry cleaning. It shall moreover be advantageous to process. It shall be readily redispersible and not block when stored as a powder.

We have found that this object is achieved by a microcapsular powder having a latent heat storage material as a capsule core and a capsule wall constructed of from 10% to 100% by weight of one or more $C_1$-$C_{24}$-alkyl esters of acrylic and/or methacrylic acid (monomers I), from 0% to 80% by weight of a water-insoluble or substantially water-insoluble bi- or polyfunctional monomer (monomers II), and, from 0% to 90% by weight of other monomers (monomer III)

all based on the total weight of the monomers, having an average particle size in the range of 150-400 μm and having 80% by weight of particles ≧90 μm in diameter.

Preferred microcapsular powder has an average particle size of ≧200 μm, in particular ≧250 μm and ≦380 μm, in particular ≦350 μm determined by Fraunhofer diffraction, volume average.

The 80% value of the width of the size distribution of the particles is ≦500 μm, preferably ≦400 μm and in particular ≦300 μm.

Preferably, 80% by weight of the particles have a diameter ≧100 μm and more preferably ≧120 μm.

The pulverulent particles of the present invention are aggregates of microcapsules the so-called primary particles. Such particles are often also referred to as a granulate or agglomerate. The surface of the pulverulent particles is uneven and jagged. The primary particles, i.e., the microcapsules in the dispersion, have an average particle size in the range from 0.5 to 30 μm and preferably in the range from 3 to 12 μm.

Since the microcapsular powder is usually produced by processing with water or aqueous materials, preparations may still comprise remnants of water. The amount of residual moisture is typically in the range from 0% to about 4% by weight based on the total weight.

The microcapsular powder of the present invention consists essentially of particles having a capsular core consisting predominantly, to more than 95% by weight, of latent heat storage materials and a polymer as capsular wall. The capsular core is solid or liquid depending on the temperature. The average particle size of the capsules (Z-average by light scattering) is in the range from 0.5 to 100 μm, preferably in the range from 1 to 80 μm and in particular in the range from 1 to 50 μm. The weight ratio of capsular core to capsular wall is generally in the range from 50:50 to 95:5. A core/wall ratio in the range from 70:30 to 93:7 is preferred.

Latent heat storage materials are by definition substances having a phase transition in the temperature range in which heat transfer is to take place. Preferably, latent heat storage materials have a solid/liquid phase transition in the temperature range from −20 to 120° C. The latent heat storage material is generally an organic, preferably lipophilic, substance.

Examples of suitable substances are:

aliphatic hydrocarbyl compounds such as saturated or unsaturated $C_{10}$-$C_{40}$-hydrocarbons, which are branched or preferably linear, e.g. such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane and cyclic hydrocarbons, e.g. cyclohexane, cyclooctane, cyclodecane;

aromatic hydrocarbyl compounds, such as benzene, naphthalene, biphenyl, o- or n-terphenyl, $C_1$-$C_{40}$-alkyl-substituted aromatic hydrocarbons, such as dodecylbenzene, tetradecylbenzene, hexadecylbenzene, hexylnaphthalene or decyinaphthalene;

saturated or unsaturated $C_6$-$C_{30}$-fatty acids, such as lauric, stearic, oleic or behenic acid, preferably eutectic mixtures of decanoic acid with e.g. myristic, palmitic or lauric acid;

fatty alcohols, such as lauryl, stearyl, oleyl, myristyl, cetyl alcohol, mixtures such as coconut fatty alcohol, and the so-called oxo alcohols which are obtained by hydroformylation of α-olefins and further reactions;

$C_6$-$C_{30}$-fatty amines, such as decylamine, dodecylamine, tetradecylamine or hexadecylamine;

esters such as $C_1$-$C_{10}$-alkyl esters of fatty acids, such as propyl palmitate, methyl stearate or methyl palmitate, and preferably their eutectic mixtures or methyl cinnamate;

natural and synthetic waxes, such as montan acid waxes, montan ester waxes, carnauba wax, polyethylene wax, oxidized waxes, polyvinyl ether wax, ethylene vinyl acetate wax or hard waxes in accordance with Fischer-Tropsch processes;

halogenated hydrocarbons, such as chloroparaffin, bromoctadecane, bromopentadecane, bromononadecane, bromoeicosane, bromodocosane.

Mixtures of these substances are also suitable provided the melting point is not lowered outside of the desired range, or the heat of fusion of the mixture is too low for a useful application.

For example, the use of pure n-alkanes, n-alkanes with a purity greater than 80% or of alkane mixtures as are produced as technical-grade distillate and as such are commercially available is advantageous.

In addition, it may be advantageous to add to capsule core-forming substances compounds which are soluble therein in order to prevent the lowering of the freezing point which sometimes arises with nonpolar substances. As described in U.S. Pat. No. 5,456,852 it is advantageous to use compounds with a melting point at from 20 to 120 K higher than the actual core substance. Suitable compounds are the fatty acids, fatty alcohols, fatty amides and aliphatic hydrocarbon compounds mentioned above as lipophilic substances. They are added in amounts of from 0.1% to 10% by weight, based on the capsule core.

The latent heat storage materials are chosen depending on the temperature range in which the heat storage media are desired. For example, for heat storage media in building materials in a moderate climate, preference is given to using latent heat storage materials whose solid/liquid phase transition is in the temperature range from 0 to 60° C. Thus, for interior applications, individual materials or mixtures with conversion temperatures of from 15 to 30° C. are usually chosen. In the case of solar applications as storage medium or avoiding the overheating of transparent thermal insulation, as described in EP-A-333 145, conversion temperatures of 30-60° C. are especially suitable.

Preferred latent heat storage materials are aliphatic hydrocarbons, particularly preferably those listed above by way of example. Particular preference is given to aliphatic hydrocarbons having 14 to 20 carbon atoms, and mixtures thereof.

The microcapsular wall is constructed of from 10% to 100% by weight and preferably of from 30% to 95% by weight of one or more $C_1$-$C_{24}$-alkyl esters of acrylic and/or methacrylic acid as monomers I. The polymers may further comprise up to 80% by weight, preferably from 5% to 60% by weight and in particular from 10% to 50% by weight of a substantially water-insoluble bi- or polyfunctional monomer as monomers II in interpolymerized form. The polymers may additionally comprise up to 90% by weight, preferably up to 50% by weight, in particular up to 30% by weight of other monomers III in interpolymerized form.

Suitable monomers I are $C_1$-$C_{24}$-alkyl esters of acrylic and/or methacrylic acid. Particularly preferred monomers I are methyl, ethyl, n-propyl and n-butyl acrylate and/or the corresponding methacrylates. Preference is given to isopropyl, isobutyl, sec-butyl and tert-butyl acrylate and the corresponding methacrylates. Methacrylonitrile should also be mentioned. In general, the methacrylates are preferred.

Suitable monomers II are bi- or polyfunctional monomers which are insoluble or sparingly soluble in water, but have a good to limited solubility in the lipophilic substance. Sparingly soluble is understood as meaning a solubility of less than 60 g/l at 20° C. Bi- or polyfunctional monomers are understood as meaning compounds which have at least 2 nonconjugated ethylenic double bonds. Of particularly suitability are divinyl and polyvinyl monomers which bring about crosslinking of the capsule wall during the polymerization.

Preferred bifunctional monomers are the diesters of diols with acrylic acid or methacrylic acid, and also the diallyl and divinyl ethers of these diols.

Preferred divinyl monomers are ethanediol diacrylate, divinylbenzene, ethylene glycol dimethacrylate, 1,3-butylene glycol dimethacrylate, methallylmethacrylamide and allyl methacrylate. Particular preference is given to propanediol diacrylate, butanediol diacrylate, pentanediol diacrylate and hexanediol diacrylate or the corresponding methacrylates.

Preferred polyvinyl monomers are trimethylolpropane triacrylate and methacrylate, pentaerythritol triallyl ether and pentaerythritol tetraacrylate.

Suitable monomers III are other monomers, preference being given to monomers IIIa such as vinyl acetate, vinyl propionate and vinylpyridine.

Particular preference is given to the water-soluble monomers IIIb, e.g, acrylonitrile, methacrylamide, acrylic acid, methacrylic acid, itaconic acid, maleic acid, maleic anhydride, N-vinylpyrrolidone, 2-hydroxyethyl acrylate and methacrylate and acrylamido-2-methylpropanesulfonic acid. In addition, N-methylolacrylamide, N-methylolmethacrylamide, dimethylaminoethyl methacrylate and diethylaminoethyl methacrylate in particular should be mentioned.

In a further preferred embodiment, the wall-forming polymers are formed of from 30% to 90% by weight of methacrylic acid, 10% to 70% by weight of an alkyl ester of (meth)acrylic acid, preferably methyl methacrylate, tert-butyl methacrylate, phenyl methacrylate and cyclohexyl methacrylate, and 0% to 40% by weight of further ethylenically unsaturated monomers. These further ethylenically unsaturated monomers may be the monomers I, II and/or III hitherto not mentioned for this embodiment. Since they generally have no significant effect on the formed microcapsules of this embodiment, their fraction is preferably <20% by weight, in particular <10% by weight. Such microcapsule dispersions and their preparation are described in EP-A-1 251 954, incorporated by reference.

The microcapsule dispersions suitable for the use according to the invention can be prepared by a so-called in-situ polymerization and are converted therefrom in the powders of the present invention.

The preferred microcapsule dispersions and their preparation are known from EP-A-457 154, DE-A-10 139 171, DE-A-102 30 581 and EP-A-1 321 182, to which reference is expressly made. Thus, the microcapsules are produced by using the monomers, a free-radical initiator, a protective colloid and the lipophilic substance to be encapsulated to produce a stable oil-in-water emulsion in which they are present as dispersed phase. Polymerization of the monomers is then triggered by heating and controlled through a further temperature increase, the resulting polymers forming the capsule wall which surrounds the lipophilic substance.

Useful free-radical initiators for the free-radical polymerization reaction include the customary peroxo and azo compounds, advantageously in amounts from 0.2% to 5% by weight, based on the weight of the monomers.

Depending on the physical state of the free-radical initiator and its solubility characteristics, the free-radical initiator can be added as such, but it is preferably added as a solution, emulsion (liquid in liquid) or suspension (solid in liquid), which makes it possible to improve the precision of metering of small amounts of free-radical initiator in particular.

Preferred free-radical initiators are tert-butyl peroxyneodecanoate, tert-amyl peroxypivalate, dilauroyl peroxide, tert-amyl peroxy-2-ethylhexanoate, 2,2'-azobis-(2,4-dimethyl)valeronitrile, 2,2'-azobis(2-methylbutyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy)hexane and cumene hydroperoxide.

Particularly preferred free-radical initiators are di(3,5,5-trimethylhexanoyl) peroxide, 4,4'-azobisisobutyronitrile, tert-butyl perpivalate and dimethyl 2,2-azobisisobutyrate. These have a half life of 10 hours in a temperature range from 30 to 100° C.

The temperature at which the polymerization is carried out is generally in the range from 20 to 100° C. and preferably in the range from 40 to 95° C. Depending on the desired lipophilic substance, the oil-in-water emulsion is to be formed at a temperature at which the core material is liquid/oily. Accordingly, the free-radical initiator chosen has to have its disintegration temperature above this temperature and the polymerization likewise has to be carried out at from 2 to 50° C. above this temperature, so that free-radical initiators whose disintegration temperature is above the melting point of the lipophilic substance are chosen, if appropriate.

A common processing variant for lipophilic substances having a melting point of up to about 60° C. is a reaction temperature starting at 60° C., which is raised to 85° C. in the course of the reaction. Advantageous free-radical initiators have a 10 hour half life in the range from 45 to 65° C. such as t-butyl perpivalate.

In a further processing variant for lipophilic substances having a melting point above 60° C., a temperature program which starts at correspondingly higher reaction temperatures is chosen. Free-radical initiators having a 10 hour half life in the range from 70 to 90° C. are preferred for initial temperatures of around 85° C. such as t-butyl per-2-ethylhexanoate.

The polymerization is conveniently carried out at atmospheric pressure, but can also be carried out at reduced or slightly elevated pressure, for example at a polymerization temperature above 100° C., i.e., in the range from 0.5 to 5 bar, say.

The reaction times for the polymerization are normally in the range from 1 to 10 hours and usually in the range from 2 to 5 hours. p Microcapsules are preferably formed by stepwise heating of the oil-in-water emulsion. Stepwise in this context is to be understood as meaning that the reaction is induced through disintegration of the free-radical initiator by raising the temperature and the polymerization is controlled by continued heating, which can take place continuously or periodically. The rate of polymerization can be controlled through choice of the temperature and the amount of free-radical initiator. This is preferably accomplished by means of a program featuring a rising temperature. The entire polymerization time may be subdivided into two or more periods for this purpose. The first polymerization period is characterized by slow disintegration of the polymerization initiator. The temperature of the reaction mixture is increased in the second polymerization period and, if appropriate, further polymerization periods to hasten the disintegration of the polymerization initiators. The temperature can be raised in one step or in more than one step or continuously in a linear or nonlinear manner. The temperature difference between the start and the end of the polymerization can be up to 50° C. This difference is generally in the range from 3 to 40° C. and preferably in the range from 3 to 30° C.

After the end temperature has been reached, the polymerization is conveniently continued for about a period of up to 2 hours in order to reduce residual monomer contents. After the actual polymerization reaction at a conversion of 90% to 99% by weight, it is generally advantageous to render the aqueous microcapsule dispersions largely free of odor carriers, such as residual monomers and other organic volatile constituents. This can be achieved in a manner known per se by physical means by distillative removal (in particular by means of steam distillation) or by stripping with an inert gas. It may also be carried out by chemical means, as described in WO 9924525, advantageously by redox-initiated polymerization, as described in DE-A-4 435 423, DE-A-4419518 and DE-A-4435422.

In this way it is possible to produce a microcapsule dispersion comprising microcapsules with an average particle size in the range from 0.5 to 30 µm, it being possible to adjust the particle size in a manner known per se via the shear force, the stirring speed, the protective colloid and its concentration.

Preferred protective colloids are water-soluble polymers since these reduce the surface tension of the water from 73 mN/m maximum to 45 to 70 mN/m and thus ensure the formation of sealed capsule walls, and form microcapsules having average particle sizes in the range from 0.5 to 30 µm and preferably from 2 to 12 µm.

In general, the microcapsules are produced in the presence of at least one organic protective colloid, which may be either anionic or neutral. Anionic and nonionic protective colloids may also be used together. Preference is given to using inorganic protective colloids if appropriate in the mixture with organic protective colloids or nonionic protective colloids.

Organically neutral protective colloids are preferred in a further embodiment.

Organic neutral protective colloids are cellulose derivatives, such as hydroxyethylcellulose, methylhydroxyethylcellulose, methylcellulose and carboxymethylcellulose, polyvinylpyrrolidone, copolymers of vinylpyrrolidone, gelatin, gum Arabic, xanthan, sodium alginate, casein, polyethylene glycols, preferably polyvinyl alcohol and partially hydrolyzed polyvinyl acetates and methylhydroxypropylcellulose.

Suitable anionic protective colloids are polymethacrylic acid, the copolymers of sulfoethyl acrylate and methacrylate, sulfopropyl acrylate and methacrylate, N-(sulfoethyl)maleimide, 2-acrylamido-2-alkylsulfonic acids, styrenesulfonic acid and vinylsulfonic acid.

Preferred anionic protective colloids are naphthalenesulfonic acid and naphthalenesulfonic acid-formaldehyde condensates and in particular polyacrylic acids and phenolsulfonic acid-formaldehyde condensates.

The anionic and nonionic protective colloids are generally used in amounts of from 0.1% to 10% by weight, based on the water phase of the emulsion.

Preference is given to inorganic protective colloids, so-called Pickering systems, which enable stabilization through very fine solid particles and are insoluble but dispersible in water or are insoluble and nondispersible in water, but wettable by the lipophilic substance.

Their mode of action and use is described in EP-A-1 029 018 and EP-A-1 321 182, both incorporated by reference.

A Pickering system can here consist of the solid particles on their own or additionally of auxiliaries which improve the dispersibility of the particles in water or the wettability of the particles by the lipophilic phase.

The inorganic solid particles may be metal salts, such as salts, oxides and hydroxides of calcium, magnesium, iron, zinc, nickel, titanium, aluminum, silicon, barium and manganese. Examples are magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcites may likewise be mentioned. Particular preference is given to finely divided silicas, magnesium pyrophosphate and tricalcium phosphate.

The Pickering systems may be added either firstly to the water phase, or be added to the stirred emulsion of oil-in-water. Some fine solid particles are prepared by a precipitation as described in EP-A 1 029 018, and EP-A 1 321 182.

The finely divided silicas may be dispersed as fine solid particles in water. It is, however, also possible to use so-called colloidal dispersions of silica in water. The colloidal dispersions are alkaline, aqueous mixtures of silica. In the alkaline pH range, the particles are swollen and are stable in water. For a use of these dispersions as Pickering system, it is advantageous if the pH of the oil-in-water emulsion is adjusted to pH 2 to 7 with an acid.

The inorganic protective colloids are generally used in amounts of from 0.5% to 15% by weight, based on the water phase.

In general, the organic neutral protective colloids are used in amounts of from 0.1% to 15% by weight, preferably from 0.5% to 10% by weight, based on the water phase.

Preferably, the dispersion conditions for preparing the stable oil-in-water emulsion are chosen in a manner known per se such that the oil droplets have the size of the desired microcapsules.

The microcapsular powder of the present invention is obtained by spray-drying the microcapsular dispersions for example. The aqueous polymeric dispersion is preferably sprayed through single-material nozzles into a stream of hot air. The droplet size at the point of exit is chosen so as to produce a microcapsular powder wherein the pulverulent particles have an average particle size in the range of 150-400 µm and 80% by weight of the particles are $\geqq$90 µm in size. The nozzle diameter and the upstream pressure of the stream of material is chosen as a function of the viscosity of the microcapsular dispersion. The higher the upstream pressure, the smaller the droplets which are produced. The pressure at which the microcapsular dispersion is supplied is typically in the range from 2-200 bar. It is advantageous to employ a single-material nozzle combined with a twist generator. Droplet size and spray angle may be additionally influenced via the choice of twist generator. It is possible, for example, to use single-material nozzles from Delavan, which have a typical construction consisting of swirl chamber, which influences the spray angle, and perforated plate, which influences the throughput.

The general procedure adopted is such that the inlet temperature of the hot air stream is in the range from 100 to 200° C. and preferably in the range from 120 to 180° C. and the outlet temperature of the hot air stream is in the range from 30 to 110° C. and preferably in the range from 50 to 90° C. The temperature difference between inlet and outlet temperatures is preferably not less than 50° C., more preferably not less than 60° C. and even more preferably not less than 70° C. Fines are normally separated from the gas stream by means of cyclones or filter separators. The fines are preferably redispersed and recycled into the stream of material. The spray-dispensed aqueous polymeric dispersion and the stream of hot air are preferably routed in parallel.

In one processing variant, the dryer is followed by a fluidized bed in order that residual moisture may be removed if appropriate. Processes where spray drying is followed by fluidized bed drying are preferred, since they lead to a microcapsular powder having a smaller fraction of fines.

Useful spray towers include for example dryers from Anhydro, Miro or Nubilosa, which have tower heights of 12-30 meters and widths in the range from 3 to 8 meters. The drying air throughput for such spray towers is typically in the range of 20-30 t/h (t=metric ton). The throughput of microcapsular dispersion is then generally in the range from 1 to 1.5 t/h.

Powder properties can further be influenced through the temperature of the after treatment at which the powder is discharged from the spray tower. The temperature range is typically set to 20-30° C., rarely higher than 40° C.

If appropriate, spraying assistants are added at the spray-drying stage to facilitate the spray-drying operation or achieve certain powder properties, for example low dust, flowability or improved redispersibility. A multiplicity of spray assistants will be familiar to those skilled in the art. Examples of spraying assistants are to be found in DE-A 19629525, DE-A 19629526, DE-A 2214410, DE-A 2445813, EP-A 407889 or EP-A 784449. Advantageous spraying assistants are for example water-soluble polymers of the polyvinyl alcohol type or partially hydrolyzed polyvinyl acetates, cellulose derivatives, such as hydroxyethylcellulose, carboxymethylcellulose, methylcellulose, methylhydroxyethylcellulose and methylhydroxypropylcellulose, polyvinylpyrrolidone, copolymers of vinylpyrrolidone, gelatin, preferably polyvinyl alcohol and partially hydrolyzed polyvinyl acetates and methylhydroxypropylcellulose.

The microcapsular dispersion is preferably produced using organically neutral protective colloids, since there is no need to add spraying assistants to the spray-drying stage in this case. The organically neutral protective colloids also act as a spraying assistant, so that their use is particularly advantageous.

The microcapsular powder of the present invention possesses good durability to dry cleaning. It is believed that this superior durability to dry cleaning is attributable to voids which form in the powder of the present invention in the course of the spray-drying operation and in which the unencapsulated remnants of wax become enclosed.

Furthermore, the microcapsular powder is readily redispersible across the entire range of its various applications in binder dispersions and together with a wide variety of fillers. Moreover, the microcapsular powder of the present invention does not block when stored for a prolonged period as a powder under normal conditions.

The microcapsular powder of the present invention has various uses. It is advantageously incorporable in textiles such as textile fabrics, textile coatings, nonwovens (batts for example), etc.

A further broad field of application is that of bindered building materials comprising mineral, silicatic or polymeric binders. A distinction is made between shaped articles and coating compositions. They are notable for their hydrolytic stability to the aqueous and often alkaline aqueous materials.

The term mineral shaped article refers to a shaped article formed, after shaping, from a mixture of a mineral binder, water, aggregates and also, if appropriate, auxiliaries by the hardening of the mineral binder/water mixture as a function of time, with or without the action of elevated temperature. Mineral binders are common knowledge. They comprise finely divided inorganic substances such as lime, gypsum, clay, loam and/or cement, which are converted to their ready-to-use form by pasting with water and in this form, when left to themselves, undergo consolidation as a function of time to a stonelike mass in air or even under water, with or without the action of elevated temperature.

The aggregates consist in general of granular or fibrous natural or synthetic rock (gravel, sand, glass fibers or mineral fibers) or else, in special cases, of metals or organic aggregates or of mixtures thereof, having grain sizes or fiber lengths each case adapted to the intended application in a conventional manner. In many cases, chromatic pigments are also used as aggregates for coloring purposes.

Useful auxiliaries include in particular those substances which hasten or delay hardening or which influence the elasticity or porosity of the consolidated mineral shaped article. In particular, they are polymers known for example from U.S. Pat. No. 4,340,510, GB-PS 15 05 558, U.S. Pat. No. 3,196,122, U.S. Pat. No. 3,043,790, U.S. Pat. No. 3,239,479, DE-A 43 17 035, DE-A 43 17 036, JP-A 91/131 533 and other references.

The microcapsular powder of the present invention is particularly suitable for modifying mineral bindered building materials (mortarlike preparations) comprising a mineral binder which consists of from 70% to 100% by weight cement and 0% to 30% by weight gypsum. This holds in particular when cement is the sole mineral binder. The effect of the present invention is essentially independent of the type of cement. Depending on the product at hand, therefore, it is possible to use blast furnace cement, oil shale cement, Portland cement, hydrophobicized Portland cement, quick-setting cement, high-expansion cement or high-alumina cement, the use of Portland cement proving to be particularly favourable. For further details reference may be made to DE-A 19 623 413. Typically, the dry compositions of mineral bindered building materials comprise from 0.1% to 20% by weight of microcapsules, based on the amount of mineral binder.

The microcapsular powder of the present invention is preferably employed in mineral coating compositions such as render. A render of this kind for the interior sector is typically composed of gypsum binder. The weight ratio of gypsum/microcapsule is generally in the range from 95:5 to 70:30. Higher microcapsular fractions are possible of course.

Coatings for the exterior sector such as exterior facings or moist environments may comprise cement (cementaceous renders), lime or waterglass (mineral or silicate renders) or polymeric dispersions (synthetic-resin renders) as a binder together with fillers and, if appropriate, pigments for coloration. The fraction of total solids accounted for by the microcapsules corresponds to the weight ratios for gypsum renders.

The microcapsular powder of the present invention is further useful in polymeric shaped articles or polymeric coating compositions. By these are mean thermoplastic and thermoset plastics materials whose processing does not entail destruction of the microcapsuies. Examples are epoxy, urea, melamine, polyurethane and silicone resins and also coating materials—solventbornes, high solids, powder coatings or waterbornes—and dispersion films. The microcapsular powder is also suitable for incorporation in polymeric foams and fibers. Examples of foams are polyurethane foam, polystyrene foam, latex foam and melamine resin foam.

The microcapsular powder of the present invention is further useful in lignocellulosic shaped articles such as chipboard.

Advantageous effects can further be achieved if the microcapsular powder of the present invention is processed in mineral shaped articles which are subjected to foaming.

The microcapsular powder of the present invention is further useful for modifying gypsum plasterboard. Microcapsular powder is incorporated in an amount which is preferably in the range from 5% to 40% by weight and in particular in the range from 20% to 35% by weight based on the total weight of the gypsum plasterboard (dry matter). The production of gypsum plasterboard comprising microencapsulated latent heat storage media is common knowledge and described in WO-A-1421243, incorporated herein by reference. Instead of cellulose-based card it is also possible to use alternative, fibrous structures as bothsided covers for the "gypsum plasterboard". Alternative materials are polymeric fibers composed for example of polypropylene, polyester, polyamide, polyacrylates, polyacrylonitrile and the like. Glass fibers are suitable as well. The alternativen materials can be employed as wovens and as nonwovens. Such building boards are known for example from U.S. Pat. No. 4,810,569, U.S. Pat. No. 4,195,110 and U.S. Pat. No. 4,394,411.

The microcapsular powder of the present invention is further useful for producing heat transfer fluid. Heat transfer fluid herein is to be understood as referring not only to fluids for heat transport but also to fluids for cold transport, i.e. coolant fluids. The principle of transferring thermal energy is the same in both cases and only differs in the direction of transfer.

Such heat transfer fluids are used according to the present invention in a system comprising a heat-absorbing part and a heat-emitting part between which the heat transfer fluid is recirculated and if appropriate a pump to transport the heat transfer fluid. The heat transfer fluid in such a system is routed closely past the heat source in order that very rapid heat absorption and hence heat removal may be achieved. The heat transfer fluid is further circulated to the heat-emitting part, where heat is emitted to the colder heat absorber. In such a heat exchanger circuit, the heat transfer fluid can circulate through convection alone. Preference is given to employing at least a pump in order that rapid energy removal or a faster heat exchange between heat source and the consumer may also be ensured. Control options for maximum heat transport and heat transfer are the velocity of the heat transfer fluid, the choice and hence the thermal capacity and the amount of the respective latent heat storage materials and a very low viscosity for the heat transfer fluid while in motion. Latent heat storage materials are to be chosen such that the temperature of the heat source is above the melting point of the heat transfer fluid and the temperature of the heat absorber is below the solidification point of the heat transfer fluid. In this connection, the melting point and the solidification point need not necessarily be the same, since freezing point depressions may also occur as described above.

The varieties of such dynamic systems and their modes of operation are well known to those skilled in the art, for example from Ullmann's Encyclopedia of Industrial Chemistry, 5th edition on CD-Rom, "Heat Exchange". They are used for example in heating and cooling systems for buildings, heating and cooling systems for automobiles, in solar installations, in cooling and freezing appliances, as industrial heat exchangers, as personal comfort systems and for microclimate heating and cooling systems.

The microcapsular powder of the present invention is dispersed in liquids such as water which are customary for this purpose. The microcapsular powder of the present invention can further be used in customary aqueous coolants or cooler-protecting compositions which comprise glycols, glycol ethers or other organic solvents for example. Such heat transfer fluids may further comprise additives such as stabilizers, corrosion inhibitors or thickeners.

The heat transfer fluids of the present invention can further be utilized in a static system. Such systems are described for example in U.S. Pat. No. 5,007,478, the statements of which shall be comprised herein. Cooling by means of a static system is utilized for example in the case of electronic components and in the case of computers to remove their heat. The heat transfer fluid is enclosed in a container when utilized in a static system. Energy exchange here too takes place via a heat exchanger which is connected to the container or via a heat exchanger within the container and simply via the container surface itself. Here, they absorb energy peaks or ensure temperature equalization over prolonged periods.

The microcapsules also exhibit excellent mechanical properties as a dispersion. They are stable under the conditions of pumping. The capsules demonstrate stabilities to mechanical loads and survive mechanical shearing rates of 10 000 rpm. They also possess good stability to hydrolysis.

The microcapsular powder of the present invention is also suitable for dumped beds.

The examples which follow illustrate the invention. The percentages in the examples are by weight. The particle size of the microcapsular powder was determined using a 3600E Malvern Particle Sizer in accordance with a standard method of measurement which is documented in the literature.

Method of determing the durability of wax capsules to dry cleaning

The solubility of microcapsular powder in tetrachloroethylene is determined. 5 g of microcapsular powder are stirred with 45 g of tetrachloroethylene with a magnetic stirrer at room temperature for 2 hours and then the powder is separated off via a fluted filter. The stirring with tetrachoroethylene dissolves escaped wax, but not the capsular wall. Subsequently, the weight of the solution in a metal dish and the residue after the solvent has been evaporated are determined. This makes it possible to determine the percentage loss of wax from the powder in the course of a dry cleaning operation.

Production of Microcapsular Dispersion

EXAMPLE 1

Aqueous Phase:

1304 kg of water 664 kg of hydroxypropylcellulose (5% in water)

166 kg of polyvinyl alcohol (degree of hydrolysis: 79%)

7.3 kg of sodium nitrite

Oily Phase 1507 kg of octadecane 31.5 kg of paraffin wax (melting point: 68-70° C.)

34 kg of methacrylic acid 68.5 kg of methyl methacrylate 68.5 kg of butanediol acrylate 2.45 kg of t-butyl perpivalate Feed Stream 1:

18.79 kg of t-butyl hydroperoxide, 10% in water

Feed Stream 2:

1.05 kg of ascorbic acid, 15 kg of caustic soda (25% in water), 100 kg of water

The above aqueous phase was introduced as initial charge at room temperature and adjusted to pH 4 with 10% nitric acid. The oily phase was added and the mixture dispersed with a high-speed dissolver at 4200 rpm. After 40 minutes of dispersing a stable emulsion of particle size from 2 to 12 µm in diameter was obtained. The emulsion was heated to 56° C. over 40 minutes, to 70° C. in the course of a further 20 minutes and to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 80 minutes with stirring at 70° C. This was followed by cooling. The microcapsular dispersion formed had a solids content of 43% and an average particle size $D(4.3)=9.0$ µm (measured using Fraunhofer diffraction, volume average).

EXAMPLE 2

Aqueous Phase:

500 kg of water 20 kg of methylcellulose (1% in water)

166 kg of polyvinyl alcohol (degree of hydrolysis: 79%)

2.1 kg of sodium nitrite solution (2.5% in water)

Oily Phase 440 kg of heptadecane 9 kg of paraffin wax (melting point: 68-70° C.)

77 kg of methyl methacrylate 33 kg of butanediol acrylate 1.35 kg t-butyl perpivalate Feed Stream 1:

1.09 kg of t-butyl hydroperoxide, 70% in water

Feed Stream 2:

0.35 kg of ascorbic acid, 24 g of caustic soda, 56 kg of water

The above aqueous phase was introduced as initial charge at room temperature and adjusted to pH 4 with 10% nitric acid. The oily phase was added and the mixture dispersed with a high-speed dissolver at 4000 rpm. After 50 minutes of dispersing a stable emulsion of particle size from 2 to 12 µm in diameter was obtained. The emulsion was heated to 56° C. over 30 minutes, to 70° C. in the course of a further 20 minutes and to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 80 minutes with stirring at 70° C. This was followed by cooling. The microcapsular dispersion formed had a solids content of 47% and an average particle size $D(4.3)=6.0$ µm (measured using Fraunhofer diffraction, volume average).

EXAMPLE 3

Aqueous Phase:

330 kg of water 180 kg of polyvinyl alcohol (degree of hydrolysis: 80%)

1.8 kg of sodium nitrite (2.5% in water)

Oily Phase 440 kg of n-tetradecane 9 kg of paraffin wax (melting point: 68-70° C.)

15 kg of methacrylic acid 77 kg of methyl methacrylate 28 kg of butanediol acrylate 1.35 kg of t-butyl perpivalate Feed Stream 1:

1.09 kg of t-butyl hydroperoxide, 70% in water

Feed stream 2:

0.34 kg of ascorbic acid, 56 kg of water

The above aqueous phase was introduced as initial charge at room temperature. The oily phase was added and the mixture dispersed with a high-speed dissolver at 4500 rpm at 40° C. After 40 minutes of dispersing a stable emulsion of particle size from 2 to 12 µm in diameter was obtained. The emulsion was heated from 40° C. to 70° C. over 60 minutes, from 70° C. to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 100 minutes with stirring at 70° C. This was followed by cooling. The microcapsular dispersion formed had a solids content of 49.5% and an average particle size 4.9 µm (measured using Fraunhofer diffraction, volume average).

EXAMPLE 4

Aqueous Phase:

1304 kg of water 670 kg of hydroxyethylcellulose (5% in water)

180 kg of polyvinyl alcohol (degree of hydrolysis: 79%)

7.9 kg of sodium nitrite

Oily Phase 1504 kg of ethyl stearate 68.5 kg of methyl methacrylate 68.5 kg of butanediol acrylate 2.45 kg of t-butyl perpivalate Feed Stream 1:

18.79 kg of t-butyl hydroperoxide, 10% in water

Feed Stream 2:

1.05 kg of ascorbic acid, 15 kg of caustic soda (25% in water), 100 kg of water

The above aqueous phase was introduced as initial charge at room temperature. The oily phase was added and the mixture dispersed with a high-speed dissolver at 3800 rpm. After 40 minutes of dispersing a stable emulsion of particle size from 2 to 12 µm in diameter was obtained. The emulsion was heated to 56° C. over 40 minutes, to 70° C. in the course of a further 20 minutes and to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 80 minutes with stirring at 70° C. This was followed by cooling. The microcapsular dispersion formed had a solids content of 43% and an average particle size 6.0 µm (measured using Fraunhofer diffraction, volume average).

EXAMPLE 5

Aqueous Phase:

572 g of water 80 g of a 50% colloidal dispersion of $SiO_2$ in water at pH 9.3 (average particle size 108.6 nm, Z-average by light scattering)

2.1 g of a 2.5% aqueous sodium nitrite solution 20 g of methylcellulose, 1% aqueous solution (viscosity 15000 mPas at 2% in water)

Oily Phase:

440 g of $C_{18}$-$C_{20}$-alkane (technical grade distillate)

77 g of methyl methacrylate 33 g of butanediol diacrylate 0.76 g of ethylhexyl thioglycolate 1.35 g of t-butyl perpivalate Feed Stream 1: 1.09 g of t-butylhydroperoxide, 70% in Water Feed Stream 2: 0.34 g of ascorbic acid, 0.024 g of NaOH, 56 g of $H_2O$ The above aqueous phase was introduced as initial charge at room temperature and adjusted to pH 4 with 3 g of 10% nitric acid. The oily phase was added and the mixture dispersed with a high-speed dissolver at 4200 rpm. After 40 minutes of dispersing a stable emulsion of particle size from 2 to 12 µm in diameter was obtained. The emulsion was heated to 56° C. over 4 minutes, to 58° C. in the course of a further 20 minutes and to 71° C. in the course of a further 60 minutes, from 71° C. to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 80 minutes with stirring at 70° C. This was followed by cooling. The microcapsular dispersion formed had a solids content of 46.8% and an average particle size D(4.3)=9.5 µm (measured using Fraunhofer diffraction, volume average).

Example of a Spray-Drying Operation

A nozzle combination comprising three single-material nozzles was used. The components of the nozzle combination from Delavan are, first, the swirl chamber and, secondly, the perforated plate to influence the throughput at given tower parameters. The spray tower has a diameter of 5 m at a height of 24 m and is operated at an underpressure of 0.5-3 mbar, measured at midtower, with up to 25 metric tons/h of steam-heated dry air in a cocurrent process. The temperature difference of the drying operation is about 70° C., the product discharge temperature being about 25° C. due to "aftertreatment". The product is discharged via cyclones. The cyclone material (fines) is redispersed and fed back in.

A microcapsular dispersion having a viscosity of 30 sec in the 4 mm Ford cup is sprayed through the nozzle combination at an upstream pressure of 20-28 bar.

EXAMPLE 6

Microcapsular powder having an average particle size of around 300 μm (diameter lower limit (80% value): 110 μm, distribution width (80%), 100-400 μm=300 μm), produced a washout loss of <1% (0.5-0.8% for several samples).

EXAMPLE 7 (NOT INVENTIVE)

Microcapsular powder having an average particle size of around 100 μm (diameter lower limit (80% value): 50 μm, distribution width (80%), 40-110 μm=70 μm), produced a washout loss of 7%.

We claim:

1. A microcapsular powder comprising:
microcapsules as primary particles which comprise:
    a capsule core of a latent heat storage material and
    a capsule wall comprising:
        from 10% to 100% by weight of one or more $C_1$-$C_{24}$-alkyl esters of acrylic and/or methacrylic acid (monomers I);
        from 0% to 80% by weight of a water-insoluble or substantially water-insoluble bi- or polyfunctional monomer (monomers II), and
        from 0% to 90% by weight of other monomers (monomer III)
        wherein weight percent is based on the total weight of the monomers,
and wherein
    the microcapsule primary particles are aggregated to form aggregates of microcapsules having an average particle size in the range of 150-400 μm, and
    80% by weight of the aggregates of microcapsules have a diameter greater than or equal to 90 μm.

2. The microcapsular powder according to claim 1, wherein 80% of the width of the size distribution of the particles is ≦500 μm in diameter.

3. The microcapsular powder according to claim 1, wherein the latent heat storage material is a lipophilic substance having a solid/liquid phase transition in the temperature range from −20 to 120° C.

4. The microcapsular powder according to claim 1, wherein the latent heat storage material is an aliphatic hydrocarbyl compound.

5. The microcapsular powder according to claim 1, wherein the capsule wall comprises:
    from 30% to 95% by weight of one or more $C_1$-$C_{24}$-alkyl esters of acrylic and/or methacrylic acid (monomers I),
    from 5% to 60% by weight of a water-insoluble or substantially water-insoluble bi- or polyfunctional monomer (monomers II), and
    from 0% to 90% by weight of other monomers (monomer III).

6. The microcapsular powder according to claim 3 which is obtained by free-radical polymerization of an oil-in-water emulsion comprising the monomers, the lipophilic substance and a protective colloid and subsequent spray drying.

7. The microcapsular powder according to claim 6 wherein the protective colloid is an organically neutral protective colloid.

8. A process for producing the microcapsular powder according to claim 1, which comprises spray-drying the microcapsular dispersion via a single-material nozzle.

9. The process according to claim 8 wherein a spraying assistant is added to the microcapsular dispersion before spray-drying.

10. A textile comprising the microcapsular powder according to claim 1.

11. A bindered building material comprising the microcapsular powder according to claim 1.

12. A heat transfer fluid comprising the microcapsular powder according to claim 1.

13. A heat transfer fluid for a system comprising:
    a heat-absorbing part;
    a heat-emitting part between which a heat transfer fluid is recirculated and
    optionally a pump to transport the heat transfer fluid,
    wherein
    the heat transfer fluid comprises the microcapsular powder according to claim 1.

14. A heat transfer fluid for a static system, comprising the microcapsular powder according to claim 1.

15. The microcapsular powder according to claim 1, wherein an amount of residual moisture is in the range from 0 to about 4% by weight based on the total weight.

16. The microcapsular powder according to claim 4, wherein the aliphatic hydrocarbyl compound is selected from the group consisting of n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, cyclohexane, cyclooctane, cyclodecane and mixtures thereof.

17. The microcapsular powder according to claim 1, wherein the average particle size of the microcapsule aggregates is in the range of from 200 to 380 μm.

18. The microcapsular powder according to claim 1, wherein 80% by weight of the particles have a diameter equal to or greater than 100 μm.

19. The microcapsular powder according to claim 17, wherein the average particle size of the microcapsule aggregates is in the range of from 250 to 350 gm and 80% by weight of the particles have a diameter equal to or greater than 120 μm.

* * * * *